US006336573B1

(12) United States Patent
Johanson

(10) Patent No.: US 6,336,573 B1
(45) Date of Patent: *Jan. 8, 2002

(54) HOPPER, OR BIN, SCREW FEEDER CONSTRUCTION CONTROLLING DISCHARGE VELOCITY PROFILE

(75) Inventor: Jerry R. Johanson, San Luis Obispo, CA (US)

(73) Assignee: Andritz-Ahlstrom Inc., Glens Falls, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/707,894

(22) Filed: Nov. 8, 2000

Related U.S. Application Data

(62) Division of application No. 09/283,253, filed on Apr. 1, 1999
(60) Provisional application No. 60/080,824, filed on Apr. 6, 1998.

(51) Int. Cl.[7] .................................................. G01F 11/20
(52) U.S. Cl. ....................................... 222/412; 198/661
(58) Field of Search ............................... 222/412, 413, 222/241; 198/661, 671

(56) References Cited

U.S. PATENT DOCUMENTS

| | | |
|---|---|---|
| 2,359,543 A | 10/1944 | Branzell et al. |
| 2,412,121 A | 12/1946 | Bradshaw |
| 2,459,180 A | 1/1949 | Richter |
| 2,474,862 A | 7/1949 | Richter |
| 2,960,161 A | 11/1960 | Richter |
| 3,041,232 A | 6/1962 | Richter et al. |
| 3,105,586 A | 10/1963 | Carew et al. |
| 3,180,525 A | 4/1965 | Fabian et al. |
| 3,240,401 A | 3/1966 | Kirschmann |
| 3,429,773 A | 2/1969 | Ritchter |
| 3,578,554 A | 5/1971 | Ritchter |
| 4,096,027 A | 6/1978 | Sherman |
| 4,721,231 A | 1/1988 | Ritchter |
| 4,759,633 A | 7/1988 | Schmid |
| 4,927,312 A | 5/1990 | Meredith et al. |
| 4,958,741 A | 9/1990 | Johanson |
| 5,052,874 A | 10/1991 | Johanson |
| 5,454,490 A | 10/1995 | Johanson |
| 5,500,083 A | 3/1996 | Johanson |
| 5,511,925 A | 4/1996 | Muth |
| 5,617,975 A | 4/1997 | Johanson et al. |
| 5,622,598 A | 4/1997 | Prough |
| 5,628,873 A | 5/1997 | Johanson et al. |
| 5,635,025 A | 6/1997 | Bilodeau |
| H1681 H | 10/1997 | Johanson et al. |
| 5,766,418 A | 6/1998 | Prough |

FOREIGN PATENT DOCUMENTS

DE    1966367    10/1973

OTHER PUBLICATIONS

"Use Screw Feeders Effectively", Marinelli et al, *Chemical Engineering Progress*, Dec. 1992, pp. 47–51.

"Feeding", Johanson, *Chemical Engineering/Deskbook Issue*, Oct. 13, 1969, pp. 75–83.

Primary Examiner—Kevin Shaver
Assistant Examiner—Mae Cartagena
(74) Attorney, Agent, or Firm—Nixon & Vanderhye P.C.

(57) ABSTRACT

A bin or hopper, preferably with one-dimensional convergence, has a slot outlet at its bottom for discharging bulk solid particulate material (such as coal, wood chips, sugar, plastic pellets, etc.) to a screw in a trough. The screw has varying flight diameter, shaft diameter, and average pitch along its length to a discharge so as to provide substantially uniform material flow velocity distribution along the slot outlet. One or more flow rate adjusters may regulate flow of material being transported by the screw. Each flow adjuster may be a vertical plate with a substantially straight-across bottom curved about a substantially horizontal axis, or with a bottom two-dimensional curvature.

9 Claims, 6 Drawing Sheets

Fig. 3a  Fig. 3b

HOPPER, OR BIN, SCREW FEEDER CONSTRUCTION CONTROLLING DISCHARGE VELOCITY PROFILE

CROSS REFERENCE TO RELATED APPLICATION

This application is based upon U.S. provisional application Serial No. 60/080,824 filed Apr. 6, 1998, the disclosure of which is incorporated by reference herein.

This application is a division of 09/283,263 filed Apr. 1, 1999.

BACKGROUND AND SUMMARY OF THE INVENTION

In handling and processing of bulk solids such as sugar, coal, drink mixes, wood chips, and various plastics (typically pellets) in a bin or hopper, it often becomes essential that the solids velocity profile across any section of the bin and/or hopper be uniform so that the bin or hopper produces a first-in/first-out flow sequence. When this flow sequence is achieved, then processing requiring gas or liquid counterflow or concurrent flow have the opportunity to maximize their efficiency. Problems of segregation of different particle sizes can be substantially eliminated and interfaces between batches of product in the same bin can be clearly defined. Achieving such a result requires that the feeder and the hopper act in unison to produce the flow uniformity desired. The larger the hopper outlet, the more sensitive flow uniformity is to the feeder design. The present invention addresses the design of a screw feeder under a slot and the associated hopper to produce the uniform flow velocity distribution desired.

Prior screw feeder art has focused mostly on compaction or extrusion screws (e.g. U.S. Pat. No. 5,052,874). No attempt has been made to integrate the workings of the screw and the hopper to control solids flow patterns. As a result, the flow from a hopper or bin is somewhat unpredictable and not suited to fully effective solids processing.

According to one aspect of the present invention a bin or hopper discharge assembly is provided comprising the following components: A bin or hopper having at least one bottom slot outlet of effective length L. At least one screw in a trough and rotatable with a screw shaft of diameter d and having flights with a flight diameter f, and an average pitch P and an effective length substantially equal to L, the screw receiving material flowing through the at least one slot outlet, and having at least one (preferably only one) discharge from the screw trough. The screw having a varying average pitch, shaft diameter, and flight diameter, and an effective length L; and the screw constructed to correspond to the formula $$\frac{[(f_{n+1})^2 - (d_{n+1})^2]P_{n+1} - [(f_n)^2 - (d_n)^2]P_n}{(P_n + P_{n+1})/2} = \frac{(f_L^2 - d_L^2)P_L}{L}$$

where $f_n$, $d_n$, and $P_n$, are the flight diameter, shaft diameter and pitch of the screw at the nth pitch increment along the length L, and $f_L$, $d_L$, and $P_L$ are the flight diameter, shaft diameter, and pitch of the last or final pitch increment under the flow outlet near the screw discharge. The bin or hopper preferably is one having one-dimensional convergence.

The assembly preferably further comprises at least one flow rate adjuster mechanism which provides flow regulation of material transported by the screw. For example, the adjuster mechanism may comprise a substantially vertical plate with a substantially straight-across bottom curved about a substantially horizontal axis. Alternatively, the adjuster mechanism may comprise a substantially vertical plate with a bottom having two-dimensional curvature. In both cases the plate's axial positions are adjustable over a part of the length of the screw, and also may be vertically adjustable. The flow rate adjusters may also be used with screws having uniform pitch, shaft diameter and flight diameter.

The at least one screw may consist of a single screw, and the at least one slot outlet may consist of a single slot outlet, and the at least one discharge may consist of a single discharge. The screw typically has front and back ends, and the at least one flow rate adjustment mechanism may comprise an adjustment mechanism at each of the front and back ends.

Alternatively, the at least one slot outlet may comprise first and second slot outlets, the at least one screw comprises a right hand screw cooperating with the first slot outlet and a left hand screw cooperating with the second slot outlet, the screws on a common shaft. In this case the at least one discharge may comprise a single common protected discharge between the first and second slot outlets, and a hanger bearing may be provided for the shaft adjacent the protected discharge. The first and second slot outlets are preferably in intermediate one-dimensional convergence hoppers beneath a larger long slot outlet hopper with one-dimensional convergence. The flow rate adjuster mechanism may be mounted adjacent an end of each screw opposite the common discharge.

Alternatively, the at least one screw consists of a single screw, and wherein the at least one slot outlet comprises more than two slot outlets from more than two intermediate one-dimensional convergence hoppers beneath a larger long slot outlet hopper with one-dimensional convergence, the more than two slot outlets collectively having the effective length L, the more than two slot outlets each cooperating with the single screw. Preferably, the at least one discharge comprises a single discharge, and a flow rate adjuster mechanism is associated with each of the more than two slot outlets. Typically, the bin or hopper contains, and feeds with a substantially uniform flow velocity distribution along the slot outlet, coal, wood chips, plastic pellets, sugar, or drink mixes, or like bulk solid particulate material.

According to another aspect of the present invention a bin or hopper assembly is provided comprising: A bin or hopper having at least one bottom slot outlet of effective length L. At least one screw in a trough for receiving material from the at least one slot outlet and having an effective length substantially equal to L. The at least one screw rotatable with a screw shaft having a diameter, and having flights with a flight diameter and an average pitch. A single discharge from the at least one screw trough. And at least one flow rate adjuster mechanism which provides flow regulation of material transported by the screw. The screw shaft diameter, flight diameter, and average pitch preferably varying along the shaft length so as to provide a substantially uniform material flow velocity for distribution along the slot outlet. The bin or hopper preferably has one-dimensional convergence.

According to yet another aspect of the present invention a bin or hopper discharge assembly is provided comprising: A bin or hopper having at least one bottom slot outlet of effective length L. At least one screw in a trough and rotatable with a screw shaft and having flights, and an average pitch, and an effective length substantially equal to L, the screw receiving material flowing from the at least one slot outlet. At least one discharge from the screw trough.

And the screw having a varying average pitch, shaft diameter, and flight diameter, and an effective length L, providing a substantially uniform flow velocity distribution along the slot outlet of solid particulate material flowing from the bin or hopper to the screw discharge. The bin or hopper preferably has one-dimensional convergence.

According to still another aspect of the invention an assembly is provided comprising: A bin or hopper (preferably having one-dimensional convergence) having at least one bottom slot outlet of effective length L. At least one screw in a trough for receiving material from the at least one slot outlet and having an effective length substantially equal to L. The at least one screw rotatable with a screw shaft having a diameter, and having flights with a flight diameter, and an average pitch. A single discharge from the at least one screw trough. The screw having a varying average pitch, shaft diameter, and flight diameter along the length thereof, and wherein the screw varying average pitch, shaft diameter, and flight diameter provide a substantially uniform flow velocity distribution along the slot outlet of solid particulate material flowing from the bin or hopper to the screw discharge.

It is a primary object of the present invention to provide enhanced uniformity of flow velocity distribution from a hopper or bin using a particular screw feeder. This and other objects of the invention will become clear from an inspection of the detailed description of the invention and from the appended claims.

BRIEF DESCRIPTION OF THE DRAWINGS

FIGS. 3A–3D are an end view (in association with the screw of FIG. 2), side view, top plan view, and isometric view, respectively, of a first embodiment of a flow adjuster usable in the assembly of FIG. 2;

DETAILED DESCRIPTION OF THE DRAWINGS

Figure 1A:
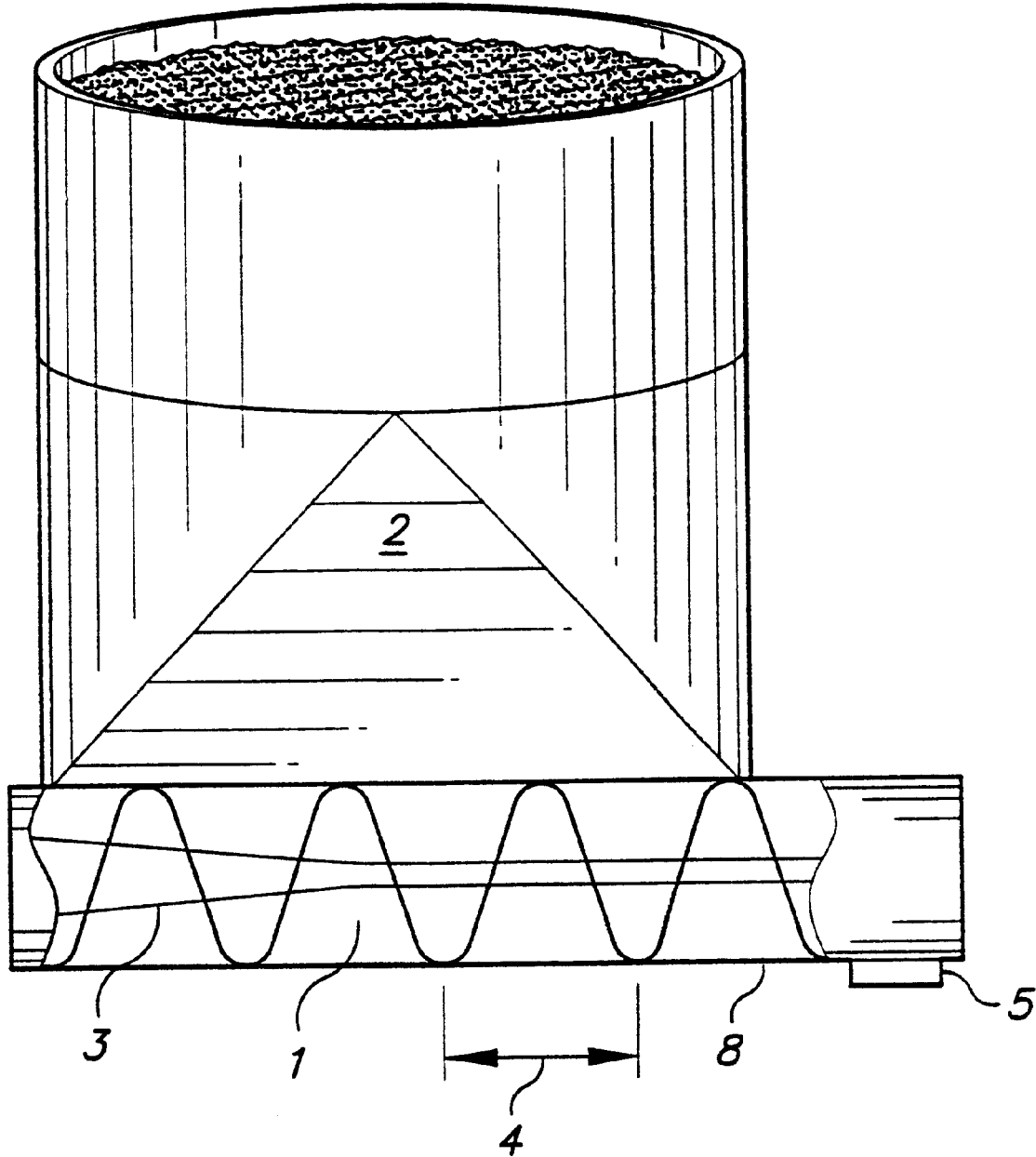
FIG. 1A is a schematic isometric view of a first embodiment of a bin or hopper assembly according to the present invention with part of the screw trough cut away for clarity of illustration.
Figure 1B:
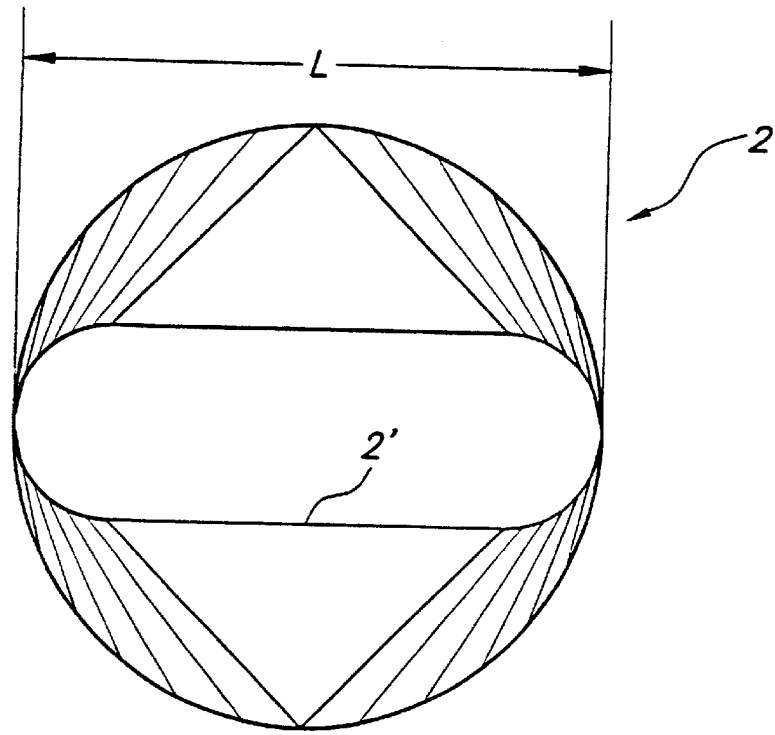
FIG. 1B is a bottom plan view of the bin or hopper of FIG. 1A, showing the slot outlet thereof.

The simplest form of the invention is a single continuous specifically designed screw 1 shown in FIG. 1A under a preferably one-dimensional convergence hopper 2. The hopper has a slit outlet 2' (see FIG. 1B). The screw 1 has a variable shaft 3 diameter, variable pitch 4, and screw discharge 5. One dimensional hoppers are shown per se in U.S. Pat. Nos. 4,958,741, 5,500,083, 5,617,975, and 5,628,873 and U.S. Statutory Invention Registration H1681, the disclosures of which are incorporated by reference herein.

Figure 3C:
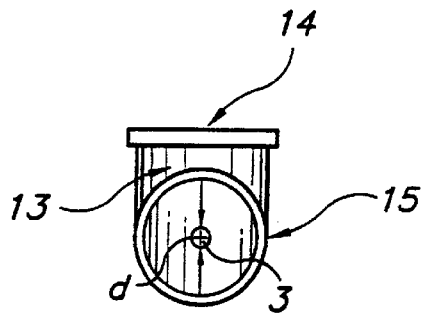
Figure 3C:
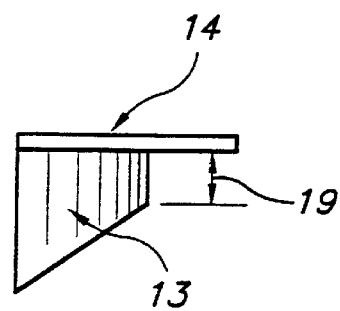
Figure 3C:
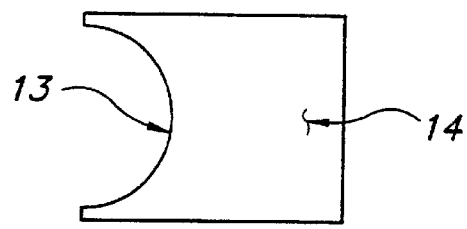
Figure 3D:
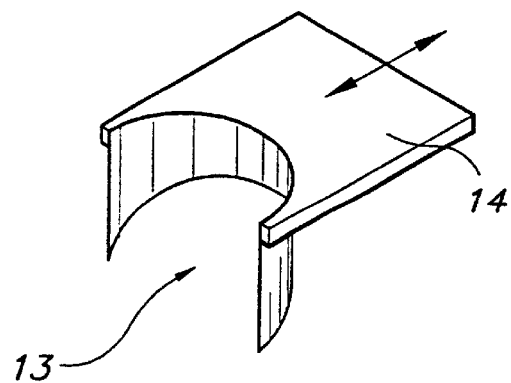

Substantially uniform flow along the effective length of the screw 1 is achieved by varying the average pitch P, shaft diameter d (see FIG. 3A) and flight diameter f (see FIG. 4A) along the effective length L of the screw 1 under the hopper outlet 2' of effective length as follows:

$$\frac{[(f_{n+1})^2 - (d_{n+1})^2]P_{n+1} - [(f_n)^2 - (d_n)^2]P_n}{(P_n + P_{n+1})/2} = \frac{(f_L^2 - d_L^2)P_L}{L}$$

where $f_n$, $d_n$, and $P_n$ are the flight diameter, shaft diameter and pitch of screw 1 at the nth pitch increment along the length L, and $f_L$, $d_L$, and $P_L$ are the flight diameter, shaft diameter, and pitch, respectively, of the last or final pitch increment under the outlet 2' near the screw discharge 5.

Figure 2:
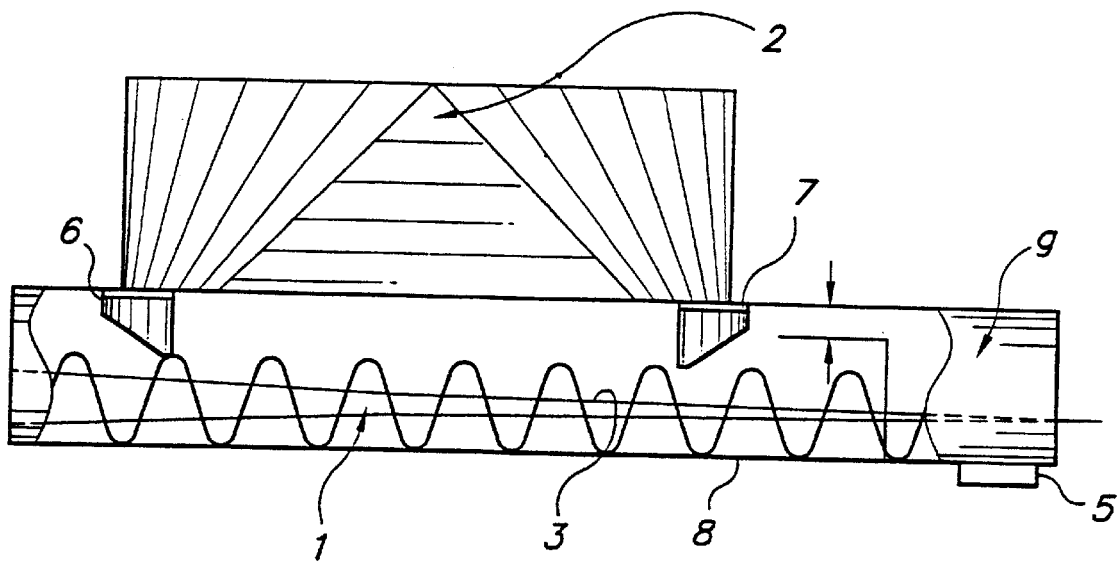
FIG. 2 is a schematic isometric view like that of FIG. 1A only for an embodiment of an assembly according to the invention having adjustable flow regulation.

The screw 1 designed in this manner will generally provide a substantially uniform flow into the screw 1 along its effective length. However, with chunky materials, like coal or wood chips, and with stringy or springy materials, like bark, shavings, or wood chips, flow into the ends of the screw 1 does not completely fill the flights unless an adjustment is made to allow for a more complete filling. This adjustment is the next complication to the invention and is illustrated in FIG. 2.

Figure 4A:
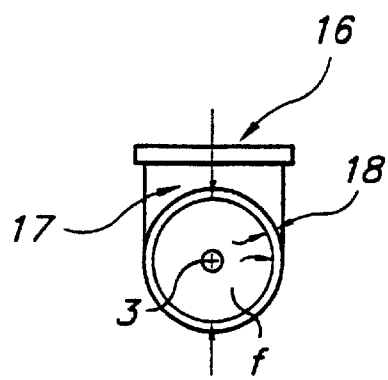
FIGS. 4A–4C are end (in association with the screw of FIG. 2), side, and top plan views, respectively, of a second embodiment of a flow adjuster usable in the assembly of FIG. 2.
Figure 4B:
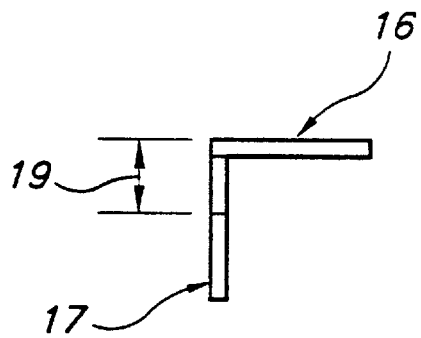
Figure 4C:
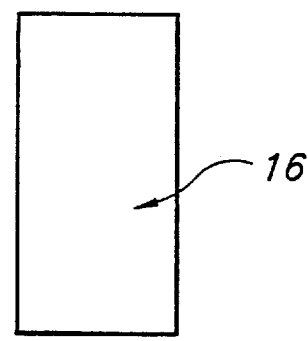

FIGS. 2, 3A–3D, and 4A–4C show an end rate adjuster mechanisms 6 and 7 incorporated into the screw 1 to provide an adjustable flow regulator. FIGS. 3A–D show a flow adjuster 6, 7 in detail comprising a flat plate 14 that extends across the width of the screw trough 8 in FIG. 2 with a section of a cylinder 13 cut off to fit the shape of the screw trough 8 in FIG. 2 and with a section of a cylinder 13 cut off to fit-the shape of the screw 1 with clearance 15 between the cylinder 13 and the screw 1. FIGS. 4A–C show another variation of the adjustment plate 16, in the form of a vertical plate 17 with a substantially straight-across bottom curved about a horizontal axis instead of the cylinder 13. The vertical plate 17 is cut off in the shape of the screw 1 with clearance 18.

The plates 14, 16 are adjustable along part of the length of the screw 1 with clearance 18, and may also be vertically adjustable. That is, the plates 14, 16 are adjustable along the length of the screw 1 to affect the flow rate into the ends of the screw 1. The vertical distance 19 (see FIGS. 3b and 4b) from the top of the screw 1 through to the bottom of the strike-off plate 13, 17 at the center of the screw is on the order of 0.1 to 0.3 times the screw diameter d. Adjustment may be provided by any suitable conventional mechanism either manual (e.g. elongated slots and cooperating bolts) or powered (e.g. pneumatic or hydraulic cylinders).

Figure 5:
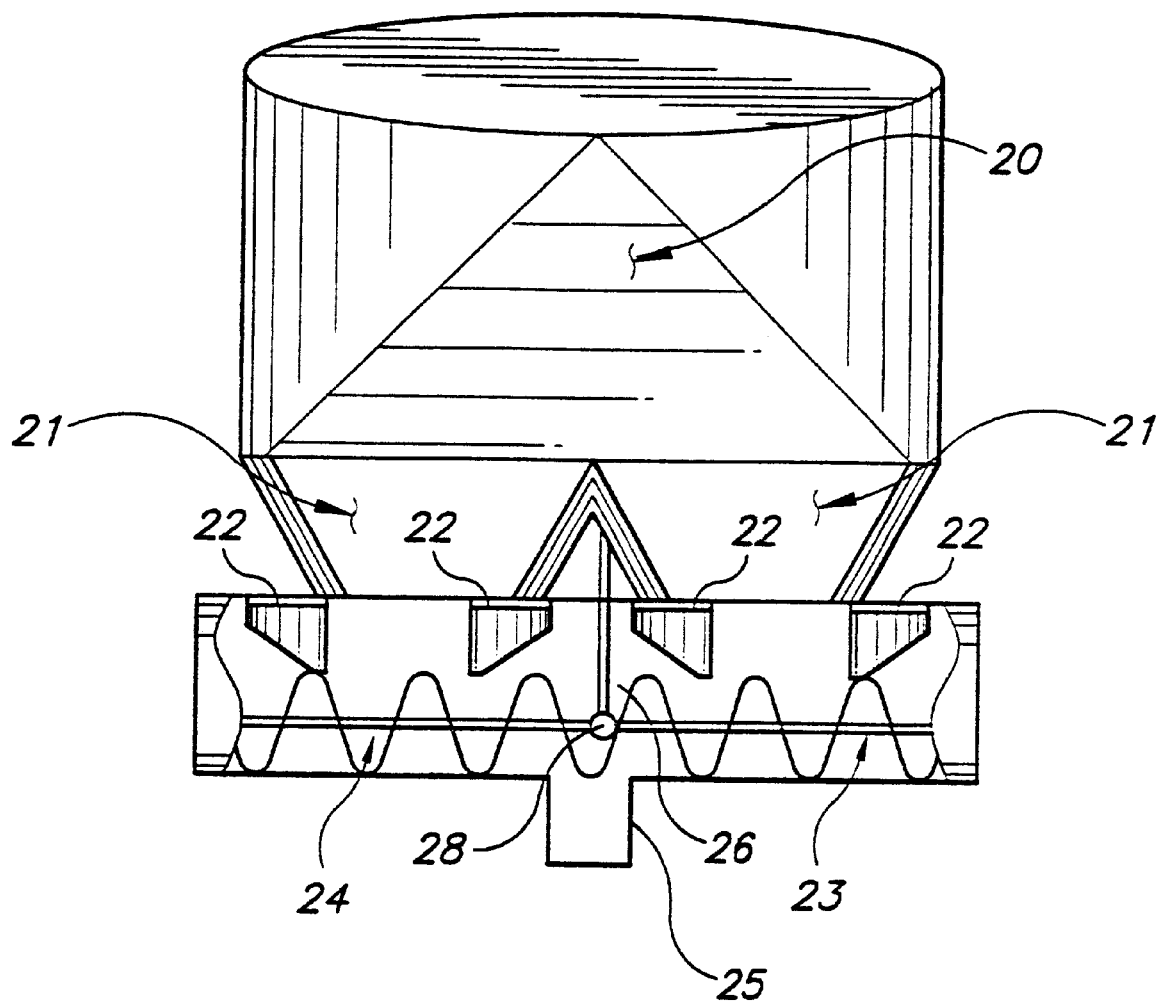
FIG. 5 is a view like that of FIG. 2 of an embodiment according to the invention having first and second opposite hand screws associated with slot outlets of two intermediate hoppers with one-dimensional convergence.
Figure 6:
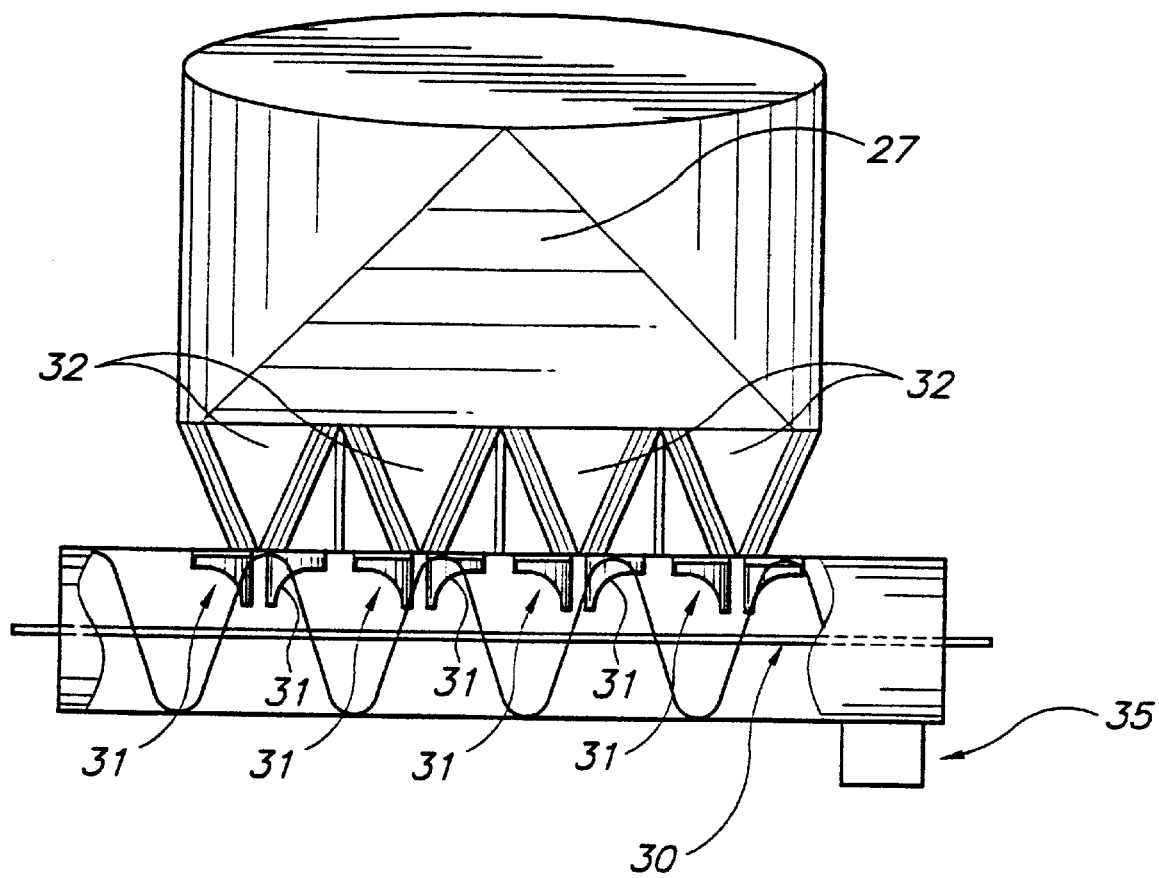
FIG. 6 is a view like that of FIG. 2 of an embodiment having a single screw and a plurality of intermediate hoppers each with a slot outlet.

Other applications of the special designed screw with end adjustment plates are shown in FIGS. 5 and 6.

FIG. 5 shows a bifurcation of a one-dimensional convergence long slot hopper 20 using two one-dimensional convergence intermediate hoppers 21 creating two shorter slots feeding left hand/right hand screws 23 and 24 on a common shaft 26 feeding a protected discharge 25 with flow controllers 22 at the end of each slot. This configuration allows for a hanger bearing 28 to be placed in the protected region between the hoppers 21 and consequently allows a much longer screw to diameter ratio. This configuration is useful for large diameter bins.

FIG. 6 shows a one-dimensional convergence main slot outlet hopper 27 with multiple slot outlets from a plurality of (more than two) intermediate one-dimensional convergence hoppers 32 feeding a variable pitch screw 30 with feed rates from each outlet adjustable with the flow rate adjusters 31 on each end of the outlets. This configuration allows for the fine tuning of the flow pattern from the slot outlet with the adjusters 31 to compensate for any bulk solids property changes that might upset the flow. It also provides for the use of multiple hanger bearings [not shown], thus extending the acceptable length of the screw 30. The screw 30 feeds the material to the outlet 35.

All of the embodiments described above provide substantially uniform flow of bulk particulate material along the effective length of the screw 1, that is providing a substantially uniform flow velocity distribution along the slot outlet of solid particulate material flowing from the bin or hopper to the screw discharge 5.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A bin or hopper assembly comprising:
   a bin or hopper having at least one bottom slot outlet of effective length L;
   at least one screw in a trough for receiving material from said at least one slot outlet and having an effective length substantially equal to L;
   said at least one screw rotatable with a screw shaft having a diameter, and having flights with a flight diameter, and an average pitch;
   a single discharge from said at least one screw trough; and
   at least one flow rate adjuster mechanism which provides flow regulation of material transported by said screw, said flow rate adjuster mechanism includes a semicircular edge adjacent to said screw.

2. An assembly as recited in claim 1 wherein said bin or hopper has one dimensional convergence and contains, and feeds with a substantially uniform flow velocity distribution along said slot outlet, coal, wood, chips, plastic pellets, sugar, or drink mixes.

3. An assembly as recited in claim 1 wherein said screw shaft diameter, flight diameter, and average pitch vary along said length of said shaft so as to provide substantially uniform material flow velocity distribution along said slot outlet.

4. An assembly as recited in claim 3 wherein said flow rate adjuster mechanism is located above said at least one screw.

5. An assembly as recited in claim 3 wherein said flow rate adjuster mechanism varies said effective length L of said at least one slot outlet.

6. An assembly as recited in claim 1 wherein said flow rate adjuster mechanism is located above said at least one screw.

7. An assembly as recited in claim 1 wherein said flow rate adjuster mechanism varies said effective length L of said at least one slot outlet.

8. A bin or hopper assembly comprising:
   a bin or hopper having at least one bottom slot outlet of effective length L;
   at least one screw in a trough for receiving material from said at least one slot outlet and having an effective length substantially equal to L;
   said at least one screw rotatable with a screw shaft having a diameter, and having flights with a flight diameter, and an average pitch;
   a single discharge from said at least one screw trough;
   said screw having a varying average pitch, shaft diameter, and flight diameter along said length thereof;
   wherein said screw varying average pitch, shaft diameter, and flight diameter provide a substantially uniform flow velocity distribution along said slot outlet of solid particulate material flowing from said bin or hopper to said screw discharge, and
   at least one flow rate adjuster mechanism which provides flow regulation of material transported by said screw, said flow rate adjuster mechanism includes a semicircular edge adjacent to said screw.

9. An assembly as recited in claim 8 wherein said bin or hopper has one-dimensional convergence.

* * * * *